(12) United States Patent
Larsen

(10) Patent No.: US 6,229,614 B1
(45) Date of Patent: May 8, 2001

(54) INTERFEROMETER

(75) Inventor: Hans Larsen, Hørsholm (DK)

(73) Assignee: Foss Electric A/S, Hillerod (DK)

( * ) Notice: Subject to any disclaimer, the term of this patent is extended or adjusted under 35 U.S.C. 154(b) by 0 days.

(21) Appl. No.: 09/214,438

(22) PCT Filed: Jul. 4, 1997

(86) PCT No.: PCT/DK97/00299

§ 371 Date: Jan. 6, 1999

§ 102(e) Date: Jan. 6, 1999

(87) PCT Pub. No.: WO98/02720

PCT Pub. Date: Jan. 22, 1998

(30) Foreign Application Priority Data

Jul. 12, 1996 (DK) .................................................. 0780/96

(51) Int. Cl.[7] .................................................. G01B 9/02
(52) U.S. Cl. .................................................. 356/452
(58) Field of Search .................... 356/345, 363, 356/346, 358, 450, 451, 452, 455

(56) References Cited

U.S. PATENT DOCUMENTS

| | | |
|---|---|---|
| 4,183,669 | 1/1980 | Doyle . |
| 4,320,973 | 3/1982 | Furtunato et al. . |
| 4,383,762 | 5/1983 | Burkert . |
| 4,915,502 | 4/1990 | Brierley . |
| 5,066,990 | 11/1991 | Rippel . |
| 5,196,902 | 3/1993 | Solomon . |
| 5,457,529 | 10/1995 | Tank et al. . |
| 5,764,361 | * 6/1998 | Kato et al. ........................ 350/363 |

FOREIGN PATENT DOCUMENTS

| | | |
|---|---|---|
| 0369054 | 5/1990 | (EP) . |
| 369054A1 | 5/1990 | (EP) . |
| 9524619 | 9/1995 | (WO) . |
| 9611387 | 4/1996 | (WO) . |

OTHER PUBLICATIONS

Peter R. Griffiths et al., "Fourier Transform Infrared Spectrometry," Chemical Analysis, vol. 83, pp. 144–145.

* cited by examiner

Primary Examiner—Frank G. Font
Assistant Examiner—Andrew H. Lee

(57) ABSTRACT

An interferometer for Fourier spectroscopy, wherein the interferometer comprises a beamsplitter (14) and two retroreflectors (20, 26), characterized in that the beamsplitter (14) is mounted movable, e.g., mounted pivotally or displacably, while both retroreflectors (20, 26) are arranged as fixed retroreflectors. The proposed structure is simple to produce, can be made substantially insensible to environmental vibrations, and it is well suited for routine measurements for the determination of quantities of predefined components in a medium. The interferometer is particularly intended for measurements in the mid- or near-infrared range for determination of the quantities of specified components in a medium, and more specifically in a food product, e.g., a liquid such as milk.

16 Claims, 5 Drawing Sheets

US 6,229,614 B1

INTERFEROMETER

This application is the national phase under 35 U.S.C. §371 of prior PCT International Application No. PCT/DK97/00299 which has an International filing date of Jul. 4, 1997 which designated the United States of America.

TECHNICAL FIELD

The present invention concerns an interferometer for Fourier spectroscopy, in which the interferometer comprises a beamsplitter and two retroreflectors which substantially are arranged to form a Fourier transform spectrometer or interferometer.

The interferometer is particularly intended for measurements in the mid-infrared range and/or near-infrared range for determination of the quantities of specified (predetermined) components in a medium or fluid, specifically a liquid, such as a solution, e.g. an aqueous solution, and more specifically in a food product, e.g. a liquid food product such as milk. The interferometer is preferably constructed for use in the infrared range and especially in the mid infrared and/or near infrared range.

BACKGROUND ART

Typically used, known interferometers have two reflecting mirrors, in some interferometers in the form of retroreflectors. Generally one of the reflecting mirrors is mounted movably in a longitudinal direction, i.e. along the path of the radiation beam. The theory and use of interferometers are thoroughly described in "Fourier transform infrared spectrometry", by Peter R. Griffiths and James A de Haseth, Vol. 83 in "Chemical Analysis". In this specification the term "retroreflector" means an optical device, such as a corner reflector or cat eye, which will reflect an incident light ray in a direction which is parallel to the incident ray, as explained in the above-mentioned reference, e.g. FIG. 4.12 on p.144.

When constructing the arrangement for the movement or longitudinal displacement of the movable mirror, or reflector, great efforts have to be made to ensure controlled displacement. A reliable interferometer shall be substantially insensible to environmental vibrations. A good interferometer will primarily be sensible to vibrations in the same direction as the controlled movement of the movable part.

U.S. Pat. No. 4,383,762 discloses a two-beam interferometer for Fourier spectroscopy designed to be housed in a cryostat aboard a spacecraft, with rigid pendulum structure mounting at least one of the movable retroreflectors in a fully compensated optical system immune to tilt and lateral movement distortions. By this structure the linear displacement is replaced by a pivotal mounting of one or both retroreflectors. Similarly, EP 369 054 describes a pendulum reflector system for a Michelson interferometer. In FIG. 1 of EP 369 054 two retroreflectors are arranged on two perpendicular arms bearing on a common pivot. These interferometers are favourable in that sense that they can be made in such a way that they are only sensible to vibrations in the direction of rotation. Further the weight of the movable parts may be compensated by a balance weight. The driving mechanism must be dimensioned to suppress movements caused by environmental vibrations.

The purpose of the present invention is to provide a simple arrangement for an interferometer said arrangement being a structure which is cheaper to manufacture than the hereto known interferometers, and which simultaneously still has the properties necessary to obtain useful measurements, which are sufficiently accurate for the purpose of the actual measurement.

SUMMARY OF THE INVENTION

According to the invention the beamsplitter is arranged in a movable beamsplitter arrangement, e.g. mounted pivotally or rotatably, and both retroreflectors are fixed. Such mounting can be realised in a very simple way, by which a cheaper manufacturing of the interferometer can be obtained.

The new interferometer is specific advantageous in that it can be made substantially insensible to vibrations. This is due to the fact that the mass of the movable, rotatable or pivotable beamsplitter can be made small, i.e. it can be considerably smaller than the mass of retroreflectors. Therefore the moment of inertia of the rotatable beamsplitter arrangement can be small compared to the moment of inertia of the movable retroreflector arrangement of prior art. Accordingly, by the new interferometer, it is easier to arrange a drive mechanism which will be able to suppress vibrations. Typically, vibrations tend to be a problem in interferometers, and especially in interferometers for milk analysis, due to the fact that such apparatus often includes a homogenizer and high pressure pumps generating vibrations.

As it will be explained in more details below, the movement of the beamsplitter creates a retardation and thereby a variable interference as in conventional interferometers.

Preferably, the beamsplitter is located in a plane which is at least nearly substantially coincident with a plane of symmetry of the two retroreflectors.

In a preferred embodiment the interferometer is specifically dedicated to the use for determination of the quantities of specified components in a medium or liquid, and more specifically in a liquid food product such as milk.

Further, the new interferometer has proved good spectral resolution in the mid-infrared range and even by short wavelengths i.e. in the near infrared range.

In the preferred embodiment of the new interferometer the structure is simple, simple to produce, and mechanically sturdy and stable.

DETAILED DESCRIPTION OF PREFERRED EMBODIMENTS

Figure 1:
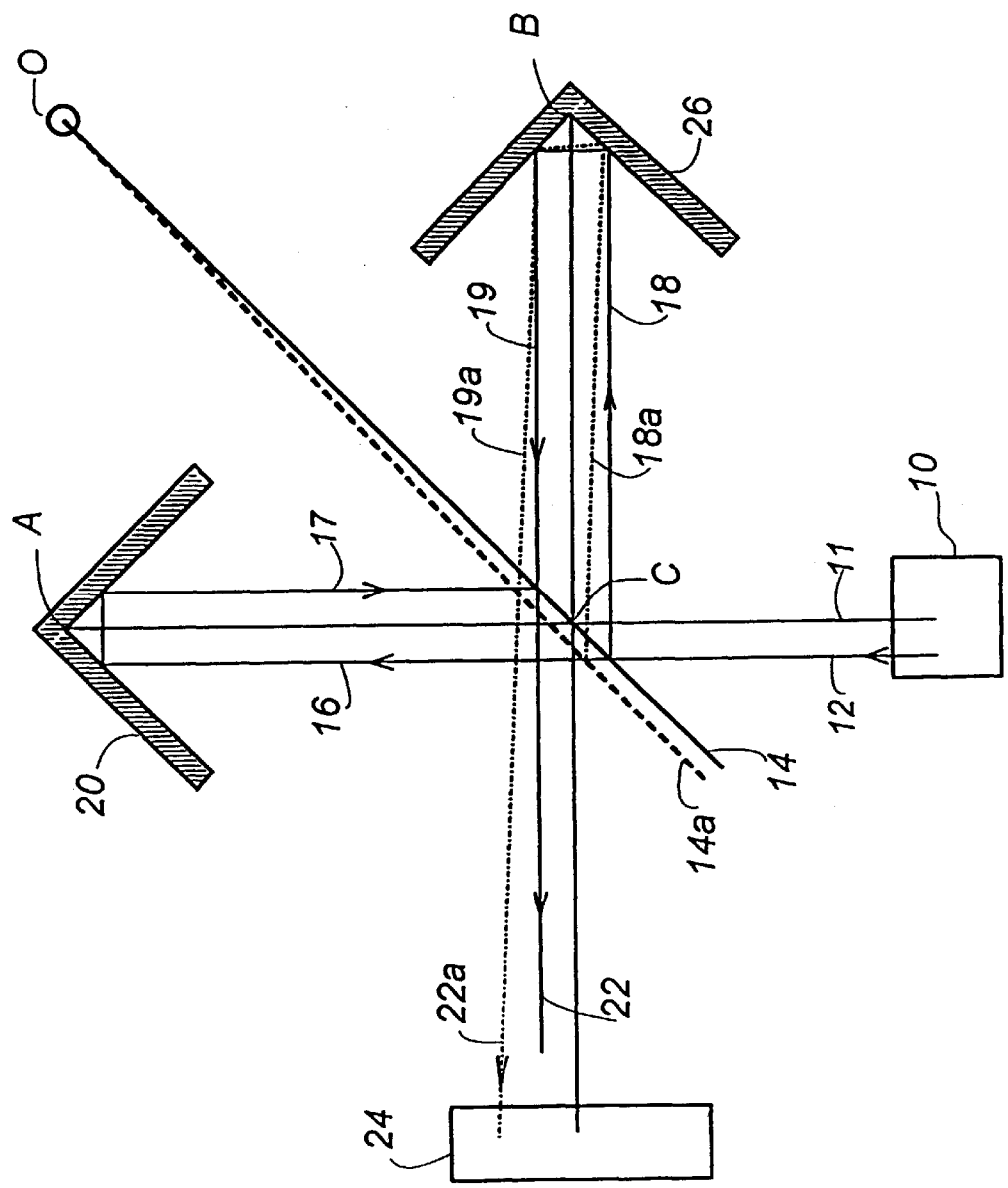
FIG. 1 shows a schematic view of a first embodiment of an interferometer according to the invention, FIG. 2 same as FIG. 1 with the beamsplitter displaced in the opposite direction.

In FIG. 1 a light source 10 emits a bundle of light beams of which—for the sake of clarity—only a centre beam 11 and a side beam 12 are shown on the drawings. The light beam 12 hits a beamsplitter 14, splitting the beam 12 into a transmitted beam 16 and a reflected beam 18. The beam 16 hits a retroreflector 20 and is reflected as the beam 17 towards the beamsplitter 14, and part of the beam is reflected in the beamsplitter 14. The retroreflectors 20, 26 are—for the sake of clarity—only shown as two plane mirrors forming a right angle. However, each of the retroreflectors 20, 26 comprises three reflecting, plane surfaces, which are mutually perpendicular.

The reflected beam 22 is directed towards a measurement cuvette 24, containing the medium, e.g. a liquid food product which is to be analysed. A detector located on the back-side of the measurement cuvette receives the transmitted light, typically via a focusing system, such as a reflecting concave mirror. Focusing systems are well-known and will therefore neither be described in this description nor shown in the drawings.

The beam 18 which was reflected in the beamsplitter 14, hits a second retroreflector 26, which reflects the beam 19 back towards the beamsplitter 14. Part of the beam is transmitted through the beamsplitter and is now substantially coincident with and interfering with the above-mentioned beam 22, hitting the measurement cuvette 24.

The beamsplitter 14 is mounted pivotally around the point O. The mount can be any kind of rotary joint, e.g. a hinge or similar articulation. Instead of a moving mirror—as it is done in the usually known kind of Michelson interferometers—the beamsplitter of the present invention is moved forward and backwards e.g. to a position as indicated by the dotted line 14a in FIG. 1 and 14b in FIG. 2.

Figure 2:
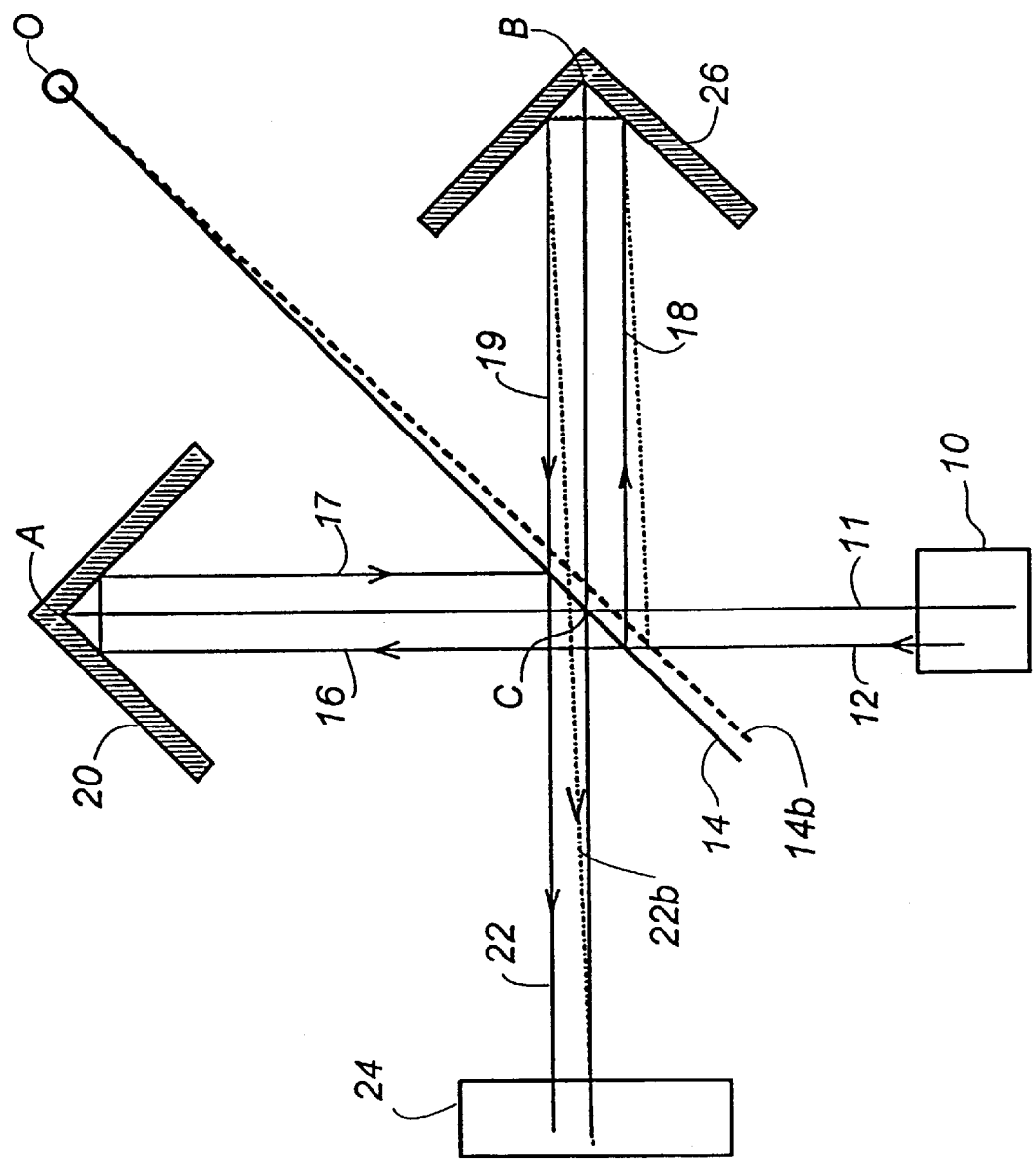

The preferred location of the pivot O is shown in FIGS. 1–2. The preferred location is characterized by O being a corner in a square including the two retroreflector tops A, B and the centre C. However other locations of O can be used, too. It is preferred that O is located in the plane of symmetry of the two retroreflectors.

For the sake of clarity the angle of beamsplitter displacement is shown in the drawings to be about 1.5°. In practical use the actual maximum displacement will depend upon the actual purpose of the measurement.

In a preferred embodiment, which is intended for determination of quantities of specific predetermined (known) components in a liquid food product, the contemplated angle is about 0.3–0.5°.

In the beamsplitter position 14a the path length of the beam 16, 17, is shortened by a length $\Delta$, compared to the original beam length in the neutral position 14.

In similar way the path length of the beam 18a, 19a, is lengthened by a distance $\Delta$, compared to the original beam length in the neutral position 14.

The total result of the beamsplitter displacement from position 14 into position 14a is a shortening of the first beam 16, 17 and a lengthening of the second beam 18, 19. When the beamsplitter 14 is moved in the opposite direction, the beam 16, 17 is lengthened and the beam 18, 19 is shortened. The result of the indicated beamsplitter displacement is therefore comparable to a displacement of one of the retroreflectors. Thereby, generally, the arrangement shown in FIG. 1 will function as an interferometer, i.e. the beam 22 impinging the cuvette 24 will be a superposition of two interfering beams, and the interference will vary with the movement of the beamsplitter, forming an interferometer suited for Fourier Transform spectroscopy. However it is much simpler to realize than the hereto known interferometers.

Figure 4:
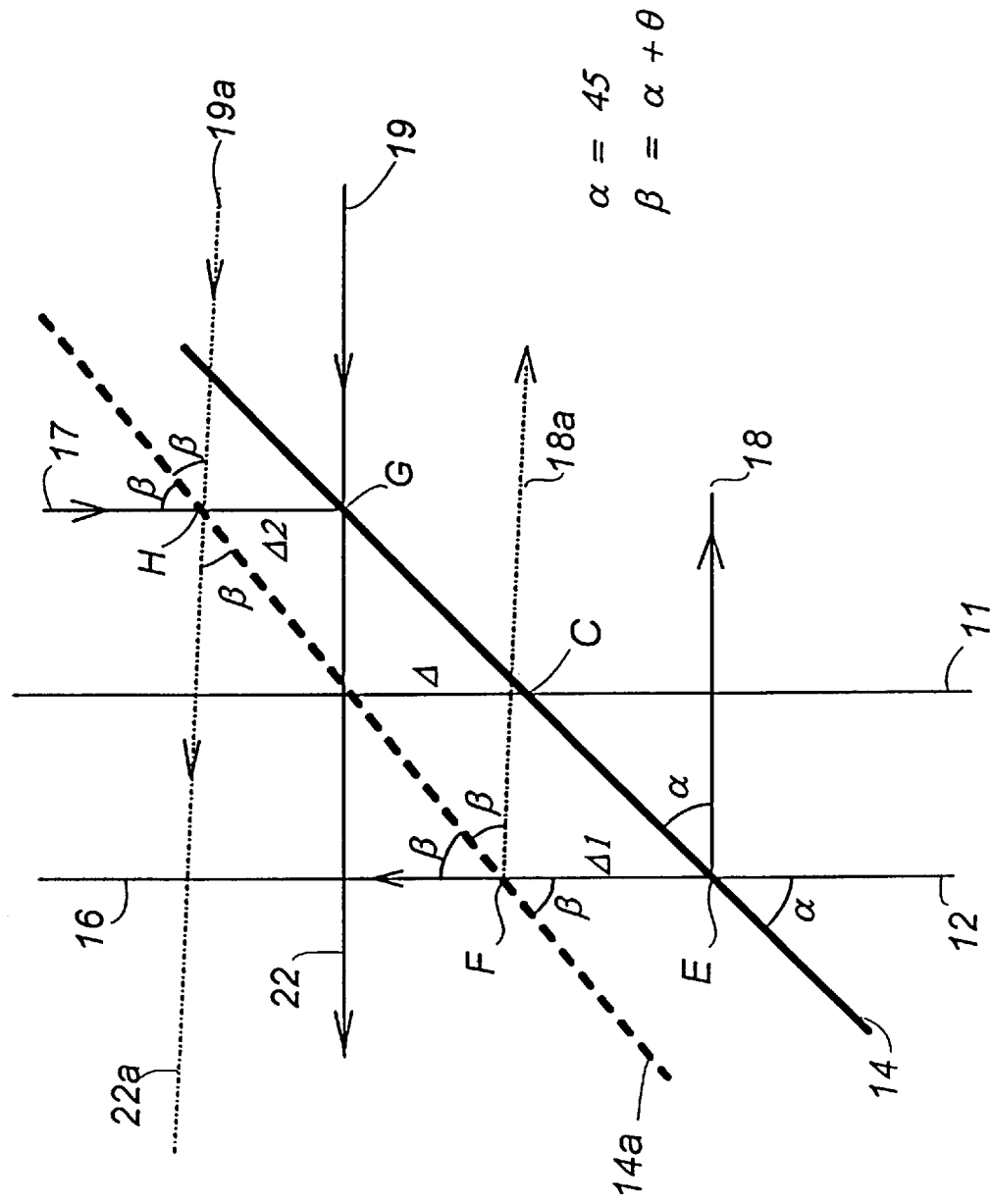
FIG. 4 shows a schematic enlarged, sectional view of the first embodiment of FIG. 1.

As it appears from the simplified drawings of FIGS. 1 and 4 the simple construction has the disadvantages that the beam 22a is displaced a distance and diverted relative to the beam 22. Calculations performed using the actually preferred dimensions show that this displacement is quite small, e.g. less than 0.038 mm, when the maximum divergence of the collimated light from the source is 3.6°.

Calculation of displacements when the beamsplitter is rotated a small angle $\theta=0.3°$. If l is the distance from the beamsplitter window to the pivot point O, and the distance between the origin E of the beam 18 and the origin F of the beam 18a is called $\Delta 1$, the distance between the origin G of the beam 22 and the origin H of the beam 22a is called $\Delta 2$, and the corresponding distance along the beam 11 is called $\Delta$, simple triangular calculations give that $$\Delta = \sqrt{2} l \sin \theta = \tfrac{1}{2}(\Delta 1 + \Delta 2)$$

The total displacement of the beam at the cuvette in the position shown in FIG. 1, i.e. without a focusing system, is $$2\Delta = 2\sqrt{2} l \sin \theta = 1.1 \text{ mm for } l=75 \text{ mm and } \theta=0.3°.$$

Such displacement can however be compensated by use of a focusing system. Preferably, if the cuvette is small, it will be arranged close to the point of focus of the focusing system.

Figure 3:
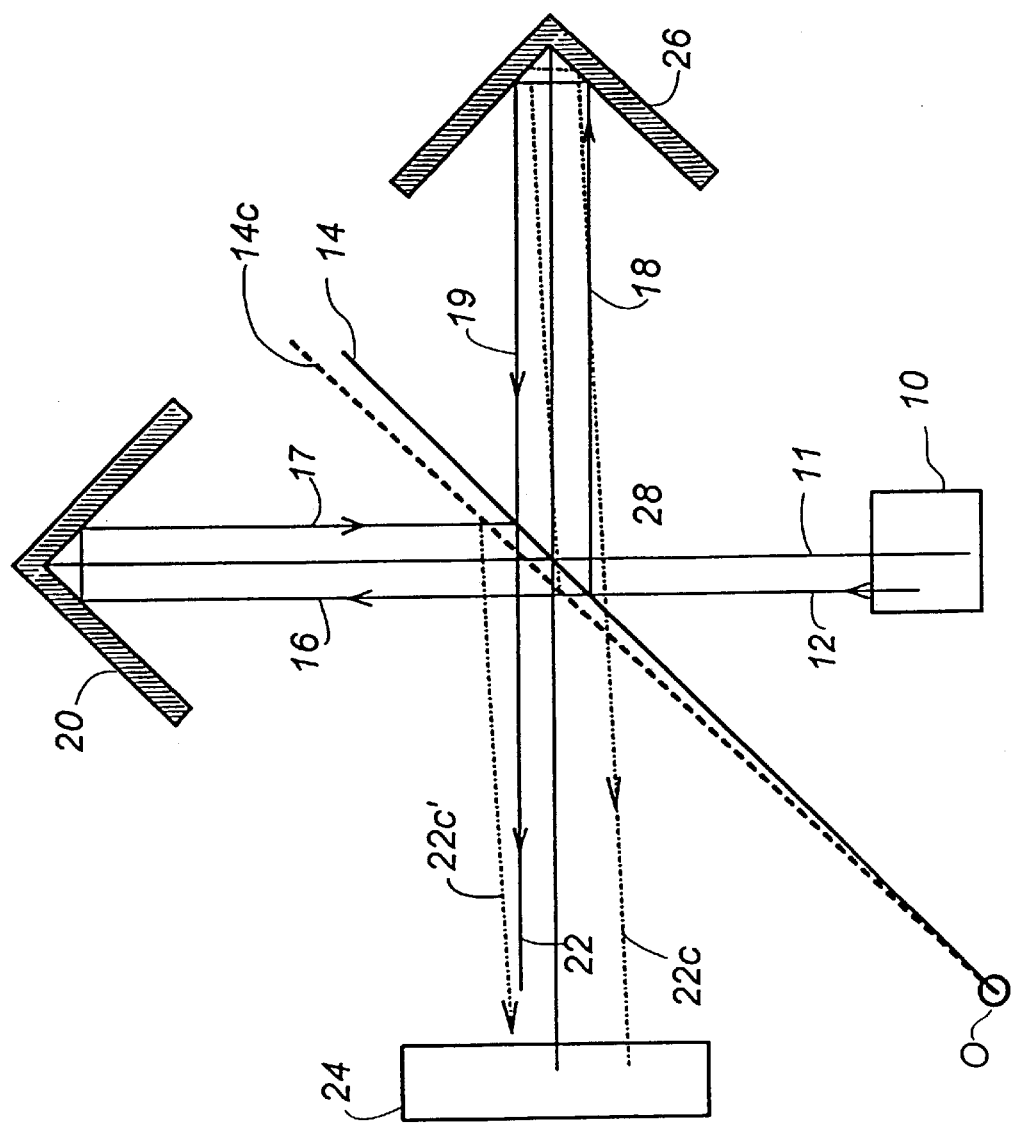
FIG. 3 shows a schematic view of a second embodiment of an interferometer according to the invention.

An alternative arrangement is shown is FIG. 3, wherein the pivot O is located between the light source 10 and the cuvette+detector 24. As it appears from the drawing, the resulting beams 22c, 22c' are mutually spaced, the distance between the beams being bigger the more the source light beam is displaced from the centre beam 11. Such displacement can be compensated by a focusing system, focusing both of the beams on the detector surface.

The retroreflectors are preferably cubic corner reflectors, i.e. having three mutually orthogonal reflecting inner surfaces. Due to the polarisation characteristics of such corner reflectors, the two corner reflectors are preferably arranged to have the same orientation of their polarisation. The mountings for the retroreflectors are preferably adjustable to allow alignment of the optical instrument to ensure the two split beams meet again, having the same polarisation at the beamsplitter. Such adjustable mountings are well-known and will therefore neither be described in this description nor shown in the drawings.

In a third embodiment the pivot O is located infinitely far away. The beamsplitter may be mounted e.g. in a slide bearing or between a couple of parallel springs, in order to give the beamsplitter a translatory movement.

Figure 5:
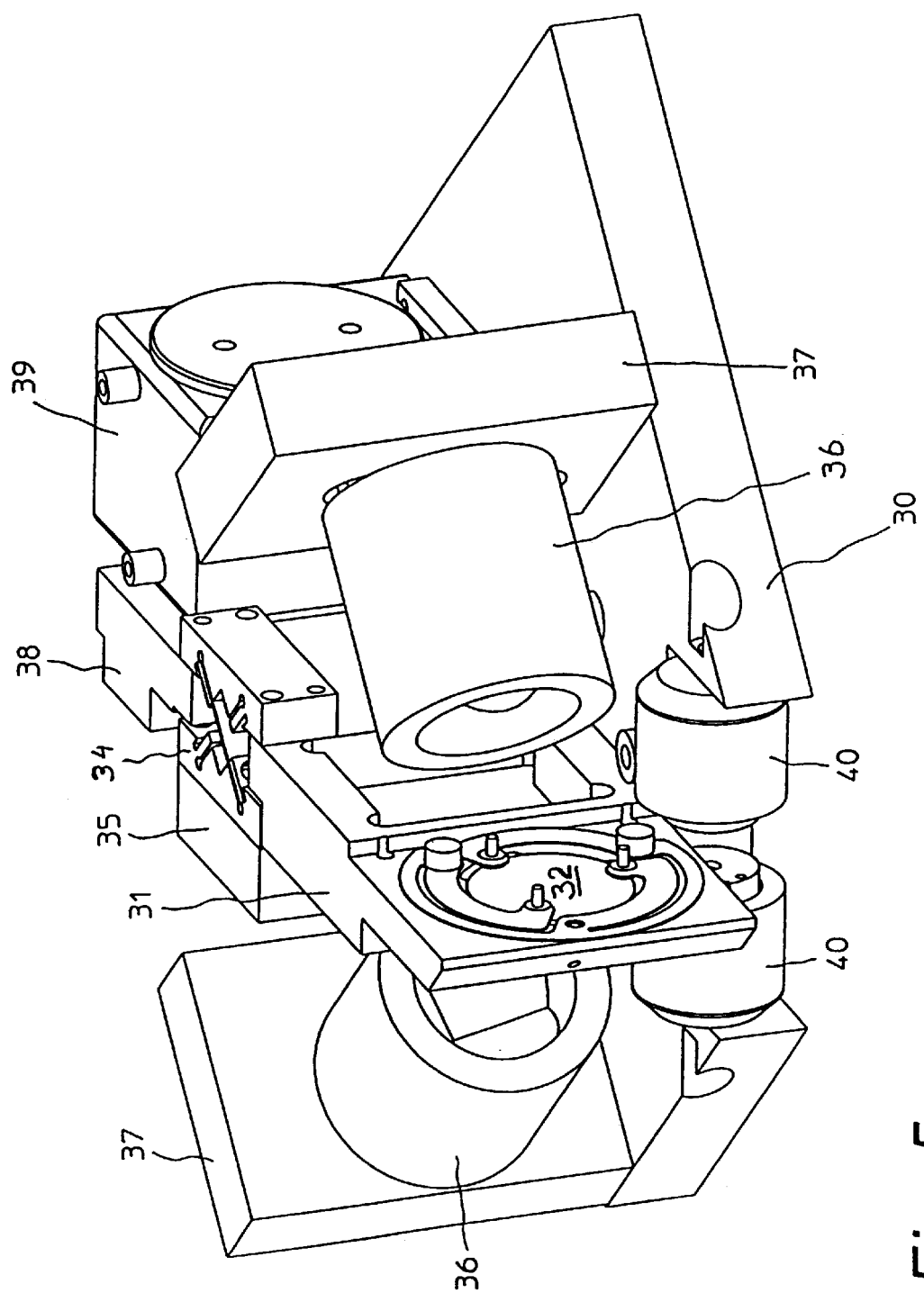
FIG. 5 shows a preferred embodiment of the new interferometer.

The vital parts of a presently preferred embodiment of the new interferometer is shown in FIG. 5. The interferometer should be enclosed in a hermetically sealed box. In order to show the interior parts the interferometer is shown without the sealed box. Further, for the sake of clarity, the light source (10 in FIG. 1) and the detector (24 in FIG. 1) are not shown in FIG. 5. The components which are not shown can be of conventional known art, and they can be arranged in known manner. A base plate 30 is used for mounting the components of the interferometer. A pivotable arm 31 bearing in a hinge 34 carries the beamsplitter 32 which can be a circular disc mounted by use of springs 33 in a recess surrounding a circular opening. A balance weight 38 is applied for balancing the beamsplitter arm 31. A motor 39 is arranged to move the beamsplitter arm 31, i.e. rotate the beamsplitter arm a small angle, typically less than 1°, e.g. 0.3°. In the preferred embodiment the motor is acting on the extension of the beamsplitter arm 31, i.e. on the balance weight 38. Typically the travel path of the beamsplitter will be a few millimetres. The motor may be an electrodynamical actuator, combined with a velocity sensor 40 for the feedback loop. The velocity sensor can either be of an electrodynamical type or be based on a phased locked loop on the laser interferogram.

Cylinders 36 accommodate the corner reflectors. Each of the corner reflectors is arranged inside the cylinder in such a way that the axis of symmetry of the corner reflector is coincident with the centre axis of the cylinder. The cylinder is mounted rotatably. By rotating the cylinder the polarisation axis of the corner reflector can be adjusted.

The cylinders 36 are adjustable mounted on mounting plates or holders 37, which are adjustable mounted on the base plate 30. The mounting is very compact. i.e. components are mounted close to each other. Preferably recesses or openings 41 are provided in the beamsplitter arm 31 to allow for the positioning of the cylinders 36 in close relation to the beamsplitter arm. The compact arrangement is favourable for the performance of the optics, by keeping the light path as short as possible.

As it will be obvious to people in the art the new interferometer as shown in the drawings and described in the preceding specification may be modified in several ways within the scope of the invention as defined in the following claims.

What is claimed is:

1. A method of recording a Fourier transform of a spectrum of a medium or fluid by use of an interferometer having at least three optical devices including a beamsplitter and two retroreflectors arranged to form a Fourier transform spectrometer, and wherein a first light beam is split into two separate beams by a beamsplitter, and wherein the two separate beams pass through two separate paths including reflecting devices and meet in the beamsplitter mutually interfering and forming a second light beam, and wherein said second light beam passes through a portion of the medium or fluid, and wherein the second light beam is detected by a detecting device after having passed through the medium or fluid, said method comprising:

moving the beamsplitter during the recording of the Fourier transform of the spectrum of the medium or fluid while the retroreflectors stay fixed.

2. A method according to claim 1, wherein the beamsplitter is moved pivotally about a pivot center.

3. A method according to claim 1, wherein the beamsplitter is moved linearly movable having an infinitely distant pivot center.

4. A method according to claim 2, wherein the beamsplitter is rotated within an angle of 2.0°.

5. A method according to claim 1, further comprising an adjustment and alignment procedure wherein the retroreflectors are moved and rotated so as to adjust their position and orientation or polarization, and a subsequent step wherein the retroreflectors are fixed.

6. An interferometer for use in the method of claim 1 for use in Fourier spectroscopy, wherein the interferometer comprises a beamsplitter arranged in a movable beamsplitter arrangement and two fixed retroreflectors which substantially are arranged to form a Fourier transform spectrometer or interferometer.

7. An interferometer according to claim 6, wherein the beamsplitter is mounted substantially in a plane of symmetry of the two retroreflectors.

8. An interferometer according to claim 6, wherein the beamsplitter is mounted pivotally about a pivot center.

9. An interferometer according to claim 6, wherein the beamsplitter is mounted linearly movable having an infinitely distance pivot center.

10. An interferometer according to claim 8, wherein the beamsplitter is arranged to move within an angle of 2.0°.

11. An interferometer according to claim 6, wherein, for the purpose of adjustment and alignment, the retroreflectors are mounted so as to be moved and rotated during an adjustment procedure by which their position and orientation of polarization are adjusted, and that retroreflectors afterwards are fixed.

12. An interferometer according to claim 7, wherein the beamsplitter is mounted pivotally about a pivot center, O, and wherein the pivot center O is a corner in a square including the two retroreflectors top corners, A, B, and a center, C, of the interferometer in the area of the beamsplitter, whereby the distance from the pivot center, O, to the center, C, of the interferometer is approximately equal to $\sqrt{2}*$ the distance AC, where AC is the distance from the top corner (A) of the retroreflector to the center (C) of the interferometer.

13. An interferometer according to claim 12, wherein the distance from the pivot center, O, to the center, C, of the interferometer is equal to $\sqrt{2}*$ the distance AC, within 10%.

14. An interferometer according to claim 6, wherein the cuvette detector arrangement is located a short path length after the beamsplitter in close proximity of the center of the interferometer.

15. An interferometer according to claim 12, wherein the cuvette detector arrangement is located in approximately the same distance from the interferometer center as the retroreflector top corners A, B.

16. Use of an interferometer according to claim 6 for determination of the quantities of specified components in a medium or liquid, and more specifically in a liquid food product such as milk.

* * * * *